United States Patent [19]

Treboux et al.

[11] Patent Number: 5,677,361
[45] Date of Patent: Oct. 14, 1997

[54] POLYOL COMPOSITIONS AND THEIR USE IN THE PREPARATION OF HIGH RESILIENCE POLYURETHANE FOAMS

[75] Inventors: Jean-Paul Rene Treboux, Burdignin, France; Philippe Martin Knaub, Lake Jackson, Tex.

[73] Assignee: Polyol International B. V., Rotterdam, Netherlands

[21] Appl. No.: 787,033

[22] Filed: Jan. 28, 1997

Related U.S. Application Data

[62] Division of Ser. No. 656,174, Aug. 7, 1996.

[30] Foreign Application Priority Data

Dec. 7, 1993 [GB] United Kingdom ............... 9325043

[51] Int. Cl.$^6$ .................................................. C08G 18/32
[52] U.S. Cl. ........................... 521/137; 521/174; 524/377
[58] Field of Search .................... 521/137, 174; 524/377

[56] References Cited

U.S. PATENT DOCUMENTS

| | | | |
|---|---|---|---|
| 3,857,800 | 12/1974 | Fishbein et al. | 260/2.5 AP |
| 4,111,865 | 9/1978 | Seefried, Jr. et al. | 521/137 |
| 4,239,856 | 12/1980 | Rowton | 521/118 |
| 4,436,843 | 3/1984 | Rowton et al. | 521/167 |
| 4,544,678 | 10/1985 | Fesman | 521/107 |
| 4,690,955 | 9/1987 | Kilgour et al. | 521/112 |
| 4,833,176 | 5/1989 | Wolf et al. | 521/160 |
| 5,011,908 | 4/1991 | Hager | 528/392 |

FOREIGN PATENT DOCUMENTS

| | | |
|---|---|---|
| 0350868 | 1/1990 | European Pat. Off. . |
| 0547764 | 6/1993 | European Pat. Off. . |
| 57-133112 | 8/1982 | Japan . |
| 57-195113 | 11/1982 | Japan . |
| 57-195725 | 12/1982 | Japan . |
| 59-100125 | 6/1984 | Japan . |
| 1339442 | 12/1973 | United Kingdom . |
| 1415560 | 11/1975 | United Kingdom . |
| 1480972 | 7/1977 | United Kingdom . |

*Primary Examiner*—Morton Foelak

[57] ABSTRACT

A polyol composition useful for the preparation of high resilience polyurethane foams comprising (1) from 80 to 99.8 weight percent of a high functionality polyol or a polyol blend having an average nominal functionality between 3.2 and 6, and from 0.2 to 20 weight percent, a subsidiary polyalkylene oxide having a poly(oxyethylene) content greater than 30 percent, or (2) from 50 to 98 weight percent of a high functionality polyol or a polyol blend having an average nominal functionality between 3.2 and 6, from 0 to 0.9 weight percent of a subsidiary polyalkylene oxide having poly(oxyetheylene) content greater than 30 percent, and from 2 to 50 weight percent of a polymer. The average nominal functionality of the polyol composition is between 3.2 and 6. This polyol composition provides greater latitude for varying formulation components in the preparation of high resilience polyurethane foam as with broad density and load ranges.

7 Claims, No Drawings

POLYOL COMPOSITIONS AND THEIR USE IN THE PREPARATION OF HIGH RESILIENCE POLYURETHANE FOAMS

CROSS-REFERENCE TO RELATED APPLICATION

This is a divisional of application Ser. No. 08/656,174 filed Aug. 7, 1996.

The present invention relates to polyol compositions, their use in the preparation of high resilience polyurethane foams and to foamed articles prepared from formulations containing such polyol formulations.

High resilience (HR) polyurethane foams are widely used in automotive, furniture and other applications due to their superior comfort, support and higher resilience characteristics. ASTM Method D-3770 sets specific guidelines for defining HR polyurethane foams. In practice, a wider class of polyurethane foams is known as high resilience foams. It is the intent of this invention to encompass this broader classification as well as the so called combustion modified high resilience (CMHR) polyurethane foams.

HR polyurethane foams are typically produced using formulations comprising (1) a polymer polyol, (2) water, (3) a crosslinking agent-chain extending agent such as diethanolamine, (4) a silicone-based foam stabilizer, (5) amine and tin catalysts, (6) toluene diisocyanate and (7) various other additives such as auxiliary blowing agents, fillers and flame retardant agents.

Processing characteristics of commercial HR polyurethane foams are usually characterized by the diethanolamine and isocyanate index ranges that give acceptable processing. A broad range is desirable both for processing and grade flexibility since load decreases as the diethanolamine level increases and isocyanate index decreases. The lower diethanol level is characterized by excessive collapse while, at the upper level, the foam will shrink. The diethanol level will typically depend on factors such as isocyanate index, water level, catalyst types and their levels, surfactants and machine parameters.

Numerous methods and polyurethane formulations employing polymer polyol compositions and/or various polyol blends have been used in the preparation of high resilience polyurethane foams, see for example, U.S. Pat. No. 4,111,865; U.S. Pat. No. 3,857,800; British Patent 1,339,442; Japanese Patents SHO 57-13312, SHO 57-195113, SHO 57-195725 and SHO 59-100125; U.S. Pat. No. 4,544,678; British Patent 1,480,972 and U.S. Pat. No. 4,690,955. In general, these methods and formulations did not provide desirable latitude for varying formulation components without adversely affecting processing and physical properties. These HR polyurethane formulations show deficiency in processing as the water level in the formulation is increased to make lower density foams, and/or as the crosslinking agent level is increased or decreased beyond the current established limits. These limitations restrict the range of foam grades, that is density and load, that can be produced and limit the applications in which these foams can be used.

For years, lower density foams have been produced by incorporating an auxiliary blowing agent into the polyurethane formulation. The most commonly used auxiliary blowing agents are halogen containing low boiling point liquids such as CFC-11. The use of this type of auxiliary blowing agents is now seen as undesirable due to concerns about their environmental effects and efforts are being made to avoid their use by using water as the only blowing agent in foam formulations.

German Offenlegungsschrift 2,263,205 discloses a process for the preparation of cold-cured, soft polyurethane foams by the reaction of toluene diisocyanate with a polyether in the presence of water and/or organic blowing agents, amine catalysts and silicone based foam stabilizer, characterized in that the polyether is a 6 to 8 functional polyether having a molecular weight from 6000 to 30000 and at least 10 weight percent of primary hydroxyl groups or a mixture of this polyether with up to 50 weight percent of a 2 to 5 functional polyether having a molecular weight from 2000 to 8000 and at least 10 weight percent primary hydroxyl groups.

U.S. Pat. No. 5,011,908 and European Patent Application Publication No. 0,350,868 disclose a polymer polyol composition comprising (1) a high functionality polyol or polyol blend with an equivalent weight between 1000 and 3000 which polyol or a polyol blend is present in an amount of from 30 to 90 weight percent of the polymer polyol composition, (2) a subsidiary polyalkylene oxide having a molecular weight between 450 and 30000 and having a poly(oxyethylene) content greater than 30 percent and wherein the polyalkylene oxide is present in an amount off from 1 to 20 weight percent based on the polymer polyol composition, and (3) a stably dispersed polymer which is present in an amount of from 2 to 50 weight percent based on the polymer polyol composition. These polymer polyol compositions, useful in the preparation of flexible polyurethane foam, provide enhanced latitude for varying formulation components to make polyurethane foams with broad load and density ranges.

It has now surprisingly been found that high resilience polyurethane foams can be prepared using a high functionality polyol or a polyol blend and a polyisocyanate, without a polymer polyol or with less than 2 weight percent of polymer based on the polymer polyol, and with or without a subsidiary polyalkylene oxide having high poly(oxyethylene) content.

Accordingly, the present invention in one embodiment concerns a polyol composition useful for the preparation of high resilience polyurethane foams comprising:

(1) a high functionality polyol or a polyol blend having an equivalent weight between 1000 and 4000 and average nominal functionality between 3.2 and 6 (preferably between 3.2 and 5.8, most preferably between 3.2 and 5.5), present in an amount of from 80 to 99.8 (preferably 91 to 99.5, most preferably 94 to 99) weight percent based on the total weight of the polyol composition, and (2) a subsidiary polyalkylene oxide containing at least one hydroxyl group which subsidiary polyalkylene oxide has an equivalent weight between 300 and 6000 and a poly(oxyethylene) content greater than 30 percent (preferably greater than 60 percent) by weight of alkylene oxide, present in an amount of from 0.2 to 20 (preferably 0.5 to 20, more preferably 1 to 9) weight percent based on the total weight of the polyol composition; wherein the average nominal functionality of the mixture of (1) and (2) is between 3.2 and 6 (preferably between 3.2 and 5.8, most preferably between 3.2 and 5.5); provided that when said subsidiary polyalkylene oxide has an equivalent weight of 1,500 or less and an average nominal functionality of at least 4, said subsidiary polyalkylene oxide is present in and amount of from 0.2 to less than 5 weight percent based on the total weight of the polyol composition; and optionally (3) a stably dispersed polyol within the high functional polyol, the subsidiary polyalkylene oxide, or a mixture thereof wherein said polymer is present in an amount of less than 2 weight percent based on the total weight of the polyol composition or a polymer polyol or a blend of polymer polyols in an amount such that the polymer present in the polymer polyol or the blend of polymer polyols provides less than 2 weight percent of the total weight of the polyol composition.

In the above described polyol composition the substantial absence of component (3) is preferred.

In another embodiment the present invention concerns a polyol composition useful for the preparation of high resilience polyurethane foams comprising:

(1) a high functionality polyol or polyol blend having an equivalent weight between 1000 and 4000 and an average nominal functionality between 3.2 and 6 (preferably between 3.2 and 5.8, most preferably between 3.2 and 5.5), present in an amount of from 50 to 98 weight percent based on the total weight of the polymer polyol composition, (2) a subsidiary polyalkylene oxide containing at least one hydroxyl group which subsidiary polyalkylene oxide has an equivalent weight between 300 and 6000 and a poly(oxyethylene) content greater than 30 (preferably greater than 60) percent by weight of alkylene oxide, present in an amount of from 0 to 0.9 (preferably 0.2 to 0.8, more preferably 0.2 to 0.6, for example, 0.4 to 0.6) weight percent based on the total weight of the polyol composition, and (3) a stably dispersed polymer within the high functionality polyol and/or the subsidiary polyalkylene oxide, wherein said polymer is present in an amount of from 2 to 50 weight percent based on the total weight of the polyol composition, or a polymer polyol or a blend of polymer polyols in an amount such that the polymer present in the polymer polyol or a blend of polymer polyols is present in an amount of from 2 to 50 weight percent based on the total weight of the polyol composition; wherein the average nominal functionality of the mixture of (1) and (2) is between 3.2 and 6 (preferably between 3.2 and 5.8, most preferably between 3.2 and 5.5).

Still in another embodiment, the present invention concerns a process for the preparation of a high resilience polyurethane foam which process comprises preparing a foam formulation comprising a polyol or a polymer polyol component, an organic polyisocyanate, water, a crosslinking/chain-extending agent, a catalyst for the formation of urethane linkages in the foam formulation, and a foam stabilizer/surfactant and thereafter allowing the foam formulation to foam and cure characterized i that said polyol or a polymer polyol component is selected from the above-described polyol compositions.

Still in another embodiment, the present invention concerns a high resilience polyurethane foam prepared by the above-described process.

The polyol compositions of the present invention provide greater latitude for varying formulation components in the preparation of high resilience polyurethane foams with broad density and load ranges.

The present invention results in high resilience polyurethane foams which show increased resilience and better compression sets, and permits the use of high levels of a crosslinking agent such as diethanolamine (DEOA) (up to 5 php), which leads to better flame resistance properties of the foam. The present invention provides excellent processability and good flame resistance properties at an extremely low level of a polymer in the polyol or even in the absence of a polymer in the polyol when toluene diisocyanate is used as the isocyanate component. Furthermore, the present invention allows for the preparation of high resilience foam over wider load range without the use of any auxiliary blowing agents.

The high functionality polyol which can be used in the practice of the present invention can be any polyalkylene oxide polyols or blends of such polyols of average nominal functionality between 3.2 and 6; having an ethylene oxide content between 8 and 25 percent; and an equivalent weight between 1000 and 4000, preferably from 1500 to 3000. These polyols and methods for their preparation are well-known to persons skilled in the art to which the present invention pertains.

The subsidiary polyalkylene oxide containing at least one hydroxyl group which can be used in the practice of the present invention, can have an equivalent weight between 300 and 6000, preferably between 500 and 6000 nominal functionality up to 8; and ethylene oxide content between 30 and 100 percent. The lower equivalent weight (300 to 2000) liquids with ethylene oxide content greater than 60 percent are preferred to ease in handling and optimum processing. The subsidiary polyalkylene oxides useful in the practice of the present invention and methods for their preparation are well-known to persons skilled in the art to which the present invention pertains.

The polymer which can be used in the present invention can be a standard vinyl polymer or copolymer; a polyurea-type polymer; or a condensation product of a polyfunctional low molecular weight glycol or glycol amine with a diisocyanate. This component is formed as a stable dispersion in one or more of the polyols by in situ polymerization of the appropriate reactive components. The level of the stably dispersed polymer can vary between 0 and less than 2 weight percent based on the total weight of the polyol composition in one embodiment of the present invention. In another embodiment of this invention the level of the dispersed polymer can vary between 2 and 50 weight percent based on the total weight of the polyol composition.

The polyols which can be utilized in the present invention can include a variety of compounds and encompass, but are not limited to, the following: (a) alkylene oxide adducts of polyhydroxyalkanes; (b) alkylene oxide adducts of nonreducing sugars and sugar derivatives; and (c) alkylene oxide adducts of polyphenols.

Illustrative alkylene oxide adducts of polyhydroxyalkanes include, among others the alkylene oxide adducts of glycerine, 1,2,3-trihydroxybutane, 1,2,5-trihydroxyhexane, 1,1,1-trimethylolethane, 1,1,1-trimethylolpropane, pentaerythritol, polycaprolactone, xylitol, arabitol, sorbitol and mannitol.

A further class of polyols which can be employed are the above-mentioned alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside and ethyl glucoside; glycol glycosides such as ethylene glycol glycoside, propylene glycol glycoside, glycerol glucoside and 1,2,6-hexanetriol glycoside, as well as the alkylene oxide adducts of the alkyl glycosides as set forth in U.S. Pat. No. 3,073,788.

A still further useful class of polyols as indicated in (c) above, is the polyphenols, and preferably the alkylene oxide adducts thereof wherein the alkylene oxides have from 2 to 4 carbon atoms. Among the polyphenols which are contemplated are, for example, condensation products of phenol and formaldehyde, and novolac resins; condensation products of various phenolic compounds and acrolein, the simplest member of this class being 1,2,3-tris(hydroxyphenyl) propanes; condensation products of various phenolic compounds and glyoxal, gluteraldehyde, and other dialdehydes with the simplest members of this class being the 1,1,2,2-tetra(hydroxyphenol)ethanes.

The alkylene oxide adducts of phosphorus and polyphosphorus acids are another useful class of polyols. Ethylene oxide, 1,2-epoxypropane, the epoxybutanes and 3-chloro-1, 2-epoxypropane are preferred alkylene oxides. Phosphoric acid, phosphorus acid, the polymethaphosphoric acids such as tripolyphosphoric acid and the polymetaphosphoric acids are desirable for use in this connection.

Indeed, any material having an active hydrogen as determined by the Zerewitinoff test may be utilized as a component of the polyol, for example, amine-terminated polyether polyols are known and may be utilized, if desired.

The most preferred polyols employed in this invention include the poly(oxypropylene-oxyethylene) glycols. Ethylene oxide, when used, can be incorporated in any fashion along the polymer chain. Stated another way, the ethylene oxide can be incorporated either in internal blocks, as terminal blocks, or may be randomly distributed along the polyol chain.

In addition to the aforementioned poly(alkylene oxide) components, the polyol composition may contain hydroxyl terminated polybutadiene. Also, addition of minor amounts of an alkenoic acid grafted polyalkylene oxide polyether may be employed to aid in reactivity control and cell opening.

The production of stably dispersed vinyl polymer or copolymer within polyols to make polymer polyols is known in the art. See, for example, U.S. Re. Pat. No. 28,175 (reissue of U.S. Pat. No. 3,383,351) and U.S. Re. Pat. No. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol.

A wide variety of monomers may be utilized in the preparation of the polymer polyols. Numerous ethylenically unsaturated monomers are disclosed in the prior patents. Any of these monomers are suitable. More recently, polyurea and polyurethane suspension polymers have also been utilized.

Exemplary monomers include styrene and its derivatives such as paramethylstyrene, acrylates, methacrylates such as methyl methacrylate, acrylonitrile and other nitrile derivatives such as methacrylonitrile. Vinylidene chloride may also be employed.

The preferred monomer mixtures used to make the polymer polyols are mixtures of acrylonitrile and styrene or acrylonitrile, styrene and vinylidene chloride.

The production of stably dispersed polyurea-type polymer or condensation product of a polyfunctional low molecular weight glycol or glycol amine with a diisocyanate within polyols to make polymer polyols is also known in the art. See, for example, British Patent No. 2,072,204 and British Patent No. 1,501,172, respectively.

A low molecular weight polyfunctional glycolamine crosslinker-extender is preferred to make stable, free rise foams under the conditions of this invention. Diethanolamine is the most commonly used commercial crosslinker and is the preferred compound of choice. Its sue at levels of from 0 to 5 php, which is much broader than what is commercially used, that is, 0.6 to 1.5 php, is facilitated by the polyol compositions described herein, and this provides for substantially broader load control. Blends of other crosslinkers with diethanolamine can also provide similar advantages. Though diethanolamine is preferred, other crosslinkers, such as, glycerine, triethanolamine, sorbitol and many other low molecular weight polyfunctional hydroxy and/or amine compounds can be substituted for diethanolamine if desired.

Any of a large number of polyurethane catalysts may be utilized for producing the polyurethane foam. Typical levels are from 0.001 to 2 php. Representative catalysts include: (a) tertiary amines such as bis(2,2'-dimethylamino)ethyl ether, trimethylamine, triethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine and pyridine oxide; (b) strong bases such as alkali and alkaline earth metal hydroxides, alkoxides, and phenoxides; (c) acidic metal salts of strong acids such as ferric chloride, stannous chloride antimony trichloride, bismuth nitrate and chloride; (d) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines and salicylaldehydeimine, with various metal such as Be, Mg, Zn, Cd, Pb, Ti, Zr, Sn, As, Bi, Cr, Mo, Mn, Fe, Co, Ni, or such ions as $MoO_2$++, $UO_2$++ (f) alcoholates and phenolates of various metals such as Ti(OR)$_4$, Sn(OR)$_4$, Sn(OR)$_2$ and Al(OR)$_3$, wherein R is alkyl or aryl, and the reaction products of alcoholates with carboxylic acids, beta-diketones, and 2-(N,N-dialkylamino) alkanols, such as the well-known chelates of titanium obtained by this or equivalent procedures; (g) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, for example, dibutyltin diacetate, dibutyltin dilaureate, dibutyltin maleate, dilauryltin diacetate, dioctyltin diacetate, dibutyltin-bis(4-methylaminobenzoate), dibutyltindilaurylmercaptide and dibutyltin-bis(6-methylaminocaproate). Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride and dioctyltin dichloride.

It is also within the scope of the invention to employ, when applicable, small amounts, for example, 0.001 percent to 5 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polyoxyalkylene bock copolymers such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. Nos. 3,505,377 and 3,686,254 and British Patent Specification No. 1,220,471. The latter class of copolymers differs from the above-mentioned polysiloxane-polyoxyalkylene block copolymers i that the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

Although it is not required, a polyether-silicone copolymer with mixed hydroxy and methoxy capping of the polyether as described in U.S. Pat. No. 4,690,955 is preferred over less stabilizing HR surfactants to counteract destabilization from the subsidiary polyol in the polyol composition of the present invention.

An advantage of this invention is the wide latitude for varying the isocyanate index and still make stable foams with low shrinkage. Suitably, the index can be varied between 75 and 120 for free rise foams.

The organic polyisocyanates that are useful in producing polyurethane foam in accordance with this invention are organic compounds that contain at least two isocyanate groups. Such compounds are well known in the art. Suitable organic polyisocyanates include the hydrocarbon diisocyanates (for example, the alkylene diisocyanates and the aryl diisocyanates, as well as known triisocyanates and polymethylene poly(phenylene isocyanates). Examples of suitable polyisocyanates are 2,4-diisocyanatotoluene, 2,6-diisocyanatotoluene, methylene bis(4-cyclohexylisocyanate), 1,8-diisocyanatooctane, 1,5-diisocyanato-2,2,4-trimethylpentane, 1,9-diisocyanatononane, 1,10-diisocyanatopropylether of 1,4-butylene glycol, 1,11-diisocyanatoundecane, 1,12-diisocyanatododecane bis(isocyanatohexyl)sulfide, 1,4-diisocyanatobenzene, 3,5-diisocyanato-o-xylene, 4,6-diisocyanato-m-xylene, 2,6-diisocyanato-p-xylene, 2,4-diisocyanato-l-chlorobenzene, 2,4-diisocyanato-l-nitrobenzene, 2,5-diisocyanate-l-nitrobenzene, 4,4'-diphenylmethylene diisocyanate, 2,4'-diphenylmethylene diisocyanate, and polymethylene poly-(phenyleneisocyanates), and mixtures thereof. The preferred polyisocyanate is 80/20 TDI (a mixture of 80 percent 2,4-toluene diisocyanate and 20 percent 2,6-toluene diisocyanate).

Water is used in an amount from 1.0 to 5.0 php to produce carbon dioxide by reaction with isocyanate and thus act as the blowing agent for the foam. Additionally, a combination of water and other known blowing agents may be employed. However, one of the advantages of the present invention is that the use of auxiliary blowing agents can be avoided or at least minimized in the foam formulation.

Various additives known to those skilled in the art may be incorporated in the foam formulations. These may include flame retardants, fillers and coloring agents.

Suitable fillers are latex, calcium carbonate, synthetic plastics including vinyl polymers such as, polyvinyl chloride and polystyrene.

Suitable coloring agents are, for example carbon black, titanium dioxide, methyl blue and chromium red.

So-called combustion modified HR polyurethane foams can be produced with the polyol composition of the present invention through the use of flame retardants.

Suitable flame retardants are melamine, antimony oxide, tris(chloroethyl) phosphate, tricresyl phosphate, aluminum hydroxide and triphenyl phosphate.

The formulations sued in preparing HR foams of the present invention are prepared by mixing the aforementioned components in standard foam processing equipment in accordance with techniques known to those skilled in the art. If desired non-interreactive components may be preblended so as to reduce the number of component streams which require intimately mixing with each other. It is generally advantageous to use a two-stream system whereby one stream comprises isocyanate component, while the second stream comprises all other components and which essentially do not interset prior to mixing with the isocyanate stream. Due to the particular components used in the present invention, a wider latitude is provided to the operator in controlling the density, load and other physical properties of the resulting polyurethane foams. In accordance with the present invention HR polyurethane foams can be prepared using wider range of water, crosslinker/chain-extender and isocyanate formulation variables. Due to this flexibility in processing, expanded density and load grades can be produced.

The following designations, symbols, terms and abbreviations are used in the examples which follow:

HN-206 is a 30/70 weight percent blend of (a) a polymer polyol (70/30 SAN, 21 percent solids) based on an ethylene oxide capped polyol having an equivalent weight of 1,700 and 17 percent EO content and (b) a glycerine started ethylene oxide capped polyol having an equivalent weight of 1,700 and 14 percent EO content; the blend having 6.3 percent solids content and nominal functionality of 3 sold by The Dow Chemical Company under the trademark VORALUX HN 206.

PP-91.1008 is a high molecular weight sorbitol based polyol having a hydroxyl number of 28 and 84 percent primary OH groups, 15.9 percent EO content, viscosity at 25° C. of 1490 cps and nominal functionality of 6.

HF-501 is a glycerine started ethylene oxide capped polyol having an equivalent weight of 1,700, hydroxyl number of 34 and nominal functionality of 3, sold by The Dow chemical Company under the trademark VORALUX HF 501.

PP-92.3047 is a sorbitol based polyol having an equivalent weight of 2,000 and hydroxyl number of 28.

PP-93.1932 is a sorbitol based polyol having an equivalent weight of 2,000 and hydroxyl number of 28.

CP-1421 is a glycerine started polyol having an equivalent weight of 1,600 hydroxyl number of 34, and 72 to 75 percent EO content sold by The Dow Chemical Company under the trademark VORANOL CP-1421.

DHD-911.01 is a butanol started monol having an a molecular weight of 3500 based on 25 percent propylene oxide/75 percent ethylene oxide mixed feed.

XZ-94816 is a polymer polyol (70/30 SAN, 43 percent solids) based on an ethylene oxide/propylene oxide mixed feed having equivalent weight of 1,000.

XZ-94557 is a high functionality polyalkylene oxide (sugar and glycerine started) having a hydroxyl number of 31 and approximately 69 percent EO content.

DEOA is diethanolamine.

B-8681 is a silicon surfactant sold by Th. Goldschmidt under the Trademark Tegostab B-8681.

DABCO 33LV is a 33 percent solution of triethylene diamine in dipropylene glycol sold by Air Products and Chemicals Inc.

NIAX A1 is 70 percent bis(2-dimethylaminoethyl)ether solution in DPG sold by OSI Specialties Inc.

SO is stannous octoate.

DBTL is dibutyltin tin dilaureate.

Amgard TDCP is a high chlorine containing phosphate ester flame retardant sold by Albright and Wilson.

T80 is an 80:20 mixture of 2,4- and 2,6-toluene diisocyanate sold by The Dow Chemical Company under the trademark VORANATE T80.

Index is the ratio of the amount of reactive isocyanate groups in the reaction mixture divided by the amount of active hydrogen groups in the reaction mixture multiplied by 100.

pbw is parts by weight.

Properties of the HR polyurethane foams given in the examples which follow are determined according to the following test methods:

Density determined in accordance with DIN 53420 method.

CFD Compression Force Deflection determined according to DIN 53577.

IFD 40% load (indentation force deflection) at 40 percent compression determined according to BS4443, part 2A-88 method.

Tens. Str. is a tensile strength determined in accordance with ASTM D-3574-91 method.

Elongation determined in accordance with ASTM D-3574-91 method.

Tear Strength determined in accordance with ASTM D-3574-91 method.

Resilience determined in accordance with ASTM D-3574-91 method.

Comp. Set is compression set determined in accordance with DIN 53572-11-86 method.

Wet Comp. is wet compression set determined in accordance with BS-4443, part 7-92 method.

Cal. 117A is the California Bulletin 117A fire retardancy test.

Cal. 117D is the California bulletin 117D fire retardancy test.

Crib 5 is the Furniture and Furnishings (Fire Safety Amendment) Regulations 1989, Schedule 1, part 1 fire retardancy test.

The following examples are given to illustrate the invention and should not be interpreted as limiting it in any way. Unless stated otherwise, all parts and percentages are given by weight.

EXAMPLES 1 to 28 and COMPARATIVE EXAMPLES C-1 to C-6

HR and CMHR polyurethane foams of Examples 1 to 20 and Comparative Examples C-1 to C-4 were prepared by mixing the components as indicated in Tables I to IV using a laboratory slabstock foam machine having a high pressure mixing head, dispensing the resulting foam mixture and allowing it to rise and cure. The machine operating conditions were as follows:

polyol component output: 20 kg/minute, polyol and isocyanate components temperature: 20° C. to 25° C., air injection level: 1 to 2 l/minute, head pressure: below 1 bar.

After sufficient cure time the produced foams were submitted to physical property determinations. The results of these tests are given in Tables 1 to 6.

TABLE I

| HR Foam Grade 30 kg/m³ | | | | | |
|---|---|---|---|---|---|
| Example | C-1* | 1 | 2 | 3 | 4 |
| Formulation: | | | | | |
| HN-206 (pbw) | 100 | — | — | — | — |
| PP-91.1008 (pbw) | — | 100 | 100 | 100 | 100 |
| Water (total) (pbw) | 3.1 | 3.1 | 3.1 | 3.1 | 3.1 |
| DEOA 100% (pbw) | 1.1 | 1.25 | 2.0 | 2.0 | 5.0 |
| T80 index | 110 | 110 | 110 | 110 | 100 |
| Amgard TDCP (pbw) | 2 | 2 | 2 | 2 | 2 |
| XZ-94557 (pbw) | 1.0 | 1.0 | 1.0 | 1.0 | 1.0 |
| Foam Properties: | | | | | |
| Blow off | + | ++ | ++ | +++ | +++ |
| Density (kg/m³) | 29.4 | 30.0 | 29.2 | 29.2 | 32.1 |
| CFD DIN 40% (kPa) | 2.62 | 1.94 | 1.81 | 1.8 | 1.65 |
| IFD 40% (N) | 107 | 72 | 74 | 70 | 67 |
| R 25%/25% | 87.3 | 89.5 | 89.3 | 89.0 | 90.3 |
| SAG factor | 2.54 | 2.68 | 2.63 | 2.8 | 3.2 |
| Tens. Str. (kPa) | 93 | 63 | 64 | 67 | 67 |
| Elongation (%) | 137 | 111 | 109 | 102 | 91 |
| Tear Strength (N/m) | 197 | 158 | 111 | 107 | 93 |
| Resilience (%) | 58 | 65 | 65 | 66 | 69 |
| Comp. Set 73% (%) | 2.8 | 3.4 | 2.9 | 3.9 | 3.8 |
| Comp. Set 90% (%) | 4.0 | 4.4 | 3.4 | 4.0 | 4.2 |
| Wet Comp 70% (%) | 10.2 | 11.0 | 13.1 | 14.1 | 16.0 |
| Cal. 117A burntlength | pass | pass | pass | fail | pass |
| after flame | pass | pass | fail | fail | pass |
| California 117 D | pass | fail | fail | pass | pass |

*Comparative Example C-1 is not an example of this invention

Examples 1 to 4 in Table I illustrate the DEOA latitude of the present invention compared to a standard commercial HR polyurethane technology (Comparative Example C-1). Examples 1 to 4 demonstrate that, at the 30 kg/m³ foam density, wider range of the DEOA level can be employed in the present invention than the one used in Comparative Example C-1 without adversely affecting the foam processing conditions. Normally, levels of DEOA lower than 1 pbw lead to collapse of the foam and levels of DEOA higher than 1.2 pbw to its shrinkage. As evident from Examples 1 to 4, DEOA level in the present invention can be varied to much greater extent (1.25 to 5 pbw) without leading to any processing problems. This is especially remarkable as no polymer polyol was used in Examples 1 to 4. The foams produced in Examples 1 to 4 are softer than the one prepared in Comparative Example C-1 with slightly worse mechanical properties but much improved resilience.

TABLE II

| HR Foam Grade 23 kg/m³ | | | | | | | | |
|---|---|---|---|---|---|---|---|---|
| Example | C-2* | C-3* | 5 | 6 | 7 | 8 | 9 | 10 |
| Formulation: | | | | | | | | |
| HN-206 (pbw) | 100 | 100 | — | — | — | — | — | — |

TABLE II-continued

HR Foam Grade 23 kg/m³

| Example | C-2* | C-3* | 5 | 6 | 7 | 8 | 9 | 10 |
|---|---|---|---|---|---|---|---|---|
| PP-91.1008 (pbw) | — | — | 100 | 100 | 100 | 100 | 100 | 100 |
| Water (total) (pbw) | 3.9 | 3.9 | 4.0 | 4.0 | 4.0 | 3.9 | 3.9 | 3.9 |
| DEOA 100% (pbw) | 2.5 | 2.5 | 2.5 | 2.0 | 1.5 | 2.5 | 2.5 | 2.5 |
| T80 index | 85 | 103 | 100 | 100 | 100 | 103 | 103 | 113 |
| Amgard TDCP (pbw) | 2 | 2 | 2 | 2 | 2 | 2 | — | — |
| XZ-94557 (pbw) | 0.5 | 0.5 | 0.5 | 0.5 | 0.5 | 0.5 | 0.5 | 0.5 |
| Foam Properties: | | | | | | | | |
| Blow off | ++ | + | +++ | +++ | +++ | +++ | +++ | +++ |
| Density (kg/m³) | 24.9 | 23.7 | 22.9 | 23.9 | 22.8 | 24.2 | 23.8 | 23.1 |
| CFD DIN 40% (kPa) | 1.17 | 1.57 | 1.1 | 1.11 | 1.28 | 1.51 | 1.35 | 1.65 |
| IFD 40% (N) | 45 | 59 | 47 | 42 | 45 | 59 | 52 | 63 |
| R 25%/25% | 88.1 | 85.6 | 84.6 | 85.1 | 85.3 | 85.7 | 86.2 | 86.7 |
| SAG factor | 2.8 | 2.78 | 2.97 | 2.73 | 2.68 | 2.94 | 2.91 | 2.74 |
| Tens. Str. (kPa) | 93 | 106 | 70 | 75 | 74 | | 73 | 71 |
| Elongation (%) | 176 | 177 | 155 | 160 | 138 | | 125 | 113 |
| Tear Strength (N/m) | 295 | 287 | 215 | 159 | 211 | | 207 | 135 |
| Resilience (%) | 59 | 56 | 55 | 57 | 56 | | 58 | 64 |
| Comp. Set 75% | 6.1 | 6.4 | 9.5 | 6.7 | 7.0 | 6.2 | 7.8 | 3.1 |
| Comp. Set 90% | 23 | 7.7 | 28 | 7.2 | 12.1 | 8.7 | 10.1 | 3.9 |
| Wet Comp. 70% | 52 | 72 | 73 | 80 | 59 | 36 | 51 | 13 |
| Cal. 117A burntlength | pass | fail | fail | pass | fail | fail | fail | fail |
| after flame | fail | fail | fail | pass | fail | fail | fail | fail |
| California 117 D | pass | pass | fail | fail | pass | pass | pass | pass |

*Comparative Example C-2 and C-3 are not examples of this invention

Table II demonstrates excellent processing characteristics of the present invention at high water levels. As can be seen from Examples 5 to 10, the DEOA level can be varied from 1.5 to 2.5 pbw without showing any signs of foam settling or collapse. This demonstrates that very soft foams can be produced according to the present invention without the need for any auxiliary blowing agents and at polyisocyanate indices of 100 and greater.

TABLE III

CMHR Foam Grades 25–28 kg/m³

| Example | C-4* | 11 | 12 | 13 | 14 | 15 | 16 |
|---|---|---|---|---|---|---|---|
| Formulation: | | | | | | | |
| HN-206 (pbw) | 100 | — | — | — | — | — | — |
| PP-91.1008 (pbw) | — | 70 | 70 | 70 | 70 | 70 | 70 |
| HF-501 (pbw) | — | 30 | 30 | 30 | 30 | 30 | 30 |
| melamine (pbw) | 25 | 25 | 25 | 25 | 25 | 25 | 25 |
| water (total) (pbw) | 4 | 4 | 4 | 4 | 4.4 | 4.4 | 4.4 |
| DEOA 100% (pbw | 1.5 | 2 | 2.52 | 2 | 2 | 2 | 2 |
| T80 index | 105 | 110 | 110 | 110 | 110 | 110 | 110 |
| Amgard TDCP (pbw) | 6 | 6 | 3 | — | 6 | 3 | — |
| XZ-94557 (pbw) | — | 0.5 | 0.5 | 0.5 | 0.5 | | 0.5 |
| Foam Properties: | | | | | | | |
| Blow off | + | | | | | | |
| Density (kg/m³) | 24.1 | 27 | 27.5 | 26.1 | 24.8 | 24.5 | 25.3 |
| CFD DIN 40% (kPa) | 2.3 | | 2.26 | | | 2.07 | |
| IFD 40% (N) | 91 | | 70 | | | 67 | |
| R 25%/25% | | | 84.6 | | | | |
| SAG factor | 3.0 | | 2.93 | | | 2.61 | |
| Tens. Str. (kPa) | 81 | | 62 | | | 52 | |
| Elongation (%) | 121 | | 93 | | | 91 | |
| Tear strength (N/m) | 308 | | 182 | | | 173 | |
| Resilience (%) | 42 | | 57 | | | 55 | |
| Comp. Set 75% (%) | 18.5 | | 5.2 | | | 5.8 | |
| Wet Comp. 70% (%) | 84 | | 35 | | | 51 | |
| Crib 5 | fail | pass | pass | fail | fail | fail | fail |
| Cal 117 A burntlength | | | | pass | | fail | fail |
| afterflame | | | | fail | | fail | fail |
| California 117 D | | | | pass | | pass | pass |

*Comparative Example C-4 is not an example of this invention.

Table III further illustrates advantages of the present invention. In Examples 11 to 16, a blend of polyols having combined nominal functionality of 5.1 is used in combination with melamine to prepare CMHR foams. It is evident from Table 3 that foams made according to the present invention show similar or better flammability performance (see Examples 11 and 12 and Comparative Example C-4) with much improved resilience and compression set, two very important foam properties.

TABLE IV

CFC Free HR Foam Formulations

| Example | | 17 | 18 | 19 | C-7* |
|---|---|---|---|---|---|
| HN-206 | pbw | — | — | — | 100 |
| PP-92.3047 | pbw | 100 | 80 | 60 | — |
| XZ-94816 | pbw | — | 20 | 40 | — |
| XZ-94557 | pbw | 0.5 | 0.5 | 0.5 | 0.5 |
| Water | pbw | 4.0 | 4.0 | 4.0 | 4.0 |
| DEOA 100% | pbw | 2.0 | 2.0 | 2.0 | 2.0 |
| NIAX A-1 | pbw | 0.03 | 0.03 | 0.03 | 0.03 |
| DABCO 33LV | pbw | 0.09 | 0.09 | 0.09 | 0.09 |
| B 8681 | pbw | 0.5 | 0.5 | 0.5 | 0.5 |
| SO | pbw | 0.1 | 0.1 | 0.1 | 0.1 |

TABLE IV-continued

CFC Free HR Foam Formulations

| Example | | 17 | 18 | 19 | C-7* |
|---|---|---|---|---|---|
| DBTL | pbw | 0.1 | 0.1 | 0.1 | 0.1 |
| Amgard TDCP | pbw | 2.0 | 2.0 | 2.0 | 2.0 |
| T80 Index | pbw | 110 | 110 | 110 | 110 |

*Comparative Example C-7 is not an example of this invention.

Table IV illustrates versatility of the present invention. As can be seen from Examples 17 to 19, a high solids content polymer polyol can be added in various amounts to the high functionality polyol without adversely affecting its processing.

TABLE V

HR Foams With Various Polyol Functionalities and Solids Content

| Sample number | C-5* | 21 | C-6* | 22 | 23 |
|---|---|---|---|---|---|
| Formulation: | | | | | |
| PP-92.3047 (pbw) | | 82 | | 82 | 60 |
| HF 501 (pbw) | — | — | — | — | — |
| XZ-94816.00 (pbw) | | 18 | | 18 | 40 |
| HN 206 (pbw) | 100 | — | 100 | — | — |
| Water (total) (pbw) | 4 | 4 | 3.1 | 3.1 | 3.1 |
| DEOA 100% (pbw) | 2.4 | 2 | 1.1 | 2.0 | 1.2 |
| CP 1421 (pbw) | — | 0.5 | — | 0.5 | 0.5 |
| DABCO 33LV (pbw) | 0.12 | 0.1 | 0.08 | 0.1 | 0.1 |
| B8681 (pbw) | 0.3 | 0.4 | 0.5 | 0.4 | 0.4 |
| DBTL (pbw) | | 0.05 | 0.05 | 0.07 | 0.07 |
| Amgard TDCP (pbw) | 2 | 2 | 2 | 2 | 6 |
| XZ-94557.00 (pbw) | 0.5 | — | — | — | — |
| DHD-911.01 (pbw) | — | — | — | — | — |
| S.O. | 0.15 | 0.15 | 0.15 | 0.1 | 0.1 |
| T80 Index | 100 | 100 | 110 | 110 | 110 |
| Foam Properties: | | | | | |
| Density (kg/m³) | 23.7 | 23.7 | 28.2 | 30.6 | 28.6 |
| CFD DIN 40% (kPa) | 1.57 | 1.66 | 2.98 | 2.74 | 3.68 |
| IFD 40% (N) | 59 | 63 | 130 | 110 | 144 |
| SAG factor | 2.78 | 2.64 | 2.41 | 2.76 | 2.73 |
| Tens. Str. (kPa) | 106 | 79 | 97 | 78 | 103 |
| Elongation (%) | 177 | 123 | 145 | 89 | 101 |
| Tear resistance (N/m) | 287 | 231 | 273 | 185 | 225 |
| Resilience (%) | 56 | 57 | 56 | 62 | 49 |
| Comp. Set 90% CT | 7.7 | 10.4 | 4.2 | 3.8 | 4.2 |
| Wet Comp. 70% CD | 72 | 28.9 | 9.2 | 8.9 | 10.3 |

*Comparative Examples C-5 and C-6 are not examples of this invention

TABLE VI

HR Foams With Various Polyol Functionalities and Solids Content

| Sample number | 24 | 25 | 26 | 27 | 28 |
|---|---|---|---|---|---|
| Formulation: | | | | | |
| PP-92.3047 (pbw) | 50 | 50 | 65 | 65 | 65 |
| HF 501 (pbw) | 50 | 50 | — | — | — |
| XZ-94816.00 (pbw) | — | — | 35 | 35 | 35 |
| HN 206 (pbw) | — | — | — | — | — |
| water (total) (pbw) | 3.1 | 4.0 | 3.1 | 3.1 | 3.1 |
| DEOA 100% (pbw) | 1.7 | 2.0 | 1.4 | 1.6 | 1.6 |
| CP 1421 (pbw) | 0.5 | 0.5 | — | — | — |
| DABCO 33LV (pbw) | 0.05 | 0.05 | 0.08 | 0.08 | 0.08 |
| B8681 (pbw) | 0.5 | 0.5 | 0.5 | 0.5 | 0.5 |
| DBTL (pbw) | 0.1 | 0.05 | 0.1 | 0.1 | 0.1 |
| Amgard TDCP (pbw) | 2 | 2 | — | — | — |
| XZ-94557.00 (pbw) | — | — | 0.5 | — | — |
| DHD-911.01 (pbw) | — | — | — | 2 | — |

TABLE VI-continued

HR Foams With Various Polyol Functionalities and Solids Content

| Sample number | 24 | 25 | 26 | 27 | 28 |
|---|---|---|---|---|---|
| S.O. | 0.1 | 0.1 | 0.1 | 0.1 | 0.1 |
| T80 Index | (110) | (100) | (115) | (115) | (115) |
| Foam Properties: | | | | | |
| Density (kg/m³) | 29.8 | 23.9 | | | |
| CFD DIN 40% (kPa) | 2.24 | 1.29 | | | |
| IFD 40% (N) | 98 | 53 | | | |
| SAG factor | 2.76 | 3.05 | | | |
| Tens. Str. (kPa) | 70 | 85 | | | |
| Elongation (%) | 112 | 179 | | | |
| Tear resistance (N/m) | 161 | 263 | | | |
| Resilience (%) | 61 | 54 | | | |
| Comp. Set 90% CT | 6.2 | 10.2 | | | |
| Blow off | | | ++ | ++ | — |

*Comparative Examples C-5 and C-6 are not examples of this invention.

Tables 5 and 6 further demonstrate versatility and advantages of the present invention. Foams have been made using different high functionality polyols and polymer polyols and various high EO containing species. The effect of these formulation components on cell-opening and processing is demonstrated in Examples 21 to 28 and is compared with conventional formulations in Comparative Examples C-5 and C-6.

We claim:

1. A process for the preparation of a high resilience slabstock polyurethane foam which process comprises preparing a foam formulation comprising a polyol, a high index polyisocyanate, water at from 1 to 5 pphp, a crosslinking agent, a catalyst for the formation of urethane linkages in the foam formulation and a surfactant, and thereafter allowing the foam formulation to foam and cure characterised in that said polyol is a polyol composition comprising:

(1) a high functionality polyol or polyol blend being a polyoxyalkylene oxide or a blend thereof having an ethylene oxide content of between 8 and 25 percent and having an equivalent weight between 1000 and 4000 and an average nominal functionality between 3.2 and 6, present in an amount of from 80 to 99.8 weight percent based on the total weight of the polyol composition, (2) a subsidiary polyalkylene oxide having a maximum functionality of 8 and containing at least one hydroxyl group which subsidiary polyalkylene oxide has an equivalent weight between 300 and 6000 and a poly (oxyethylene) content greater than 30 percent by weight of alkylene oxide present in an amount of from 0.2 to 20 weight percent based on the total weight of the polyol composition; wherein the average nominal functionality of the mixture of (1) and (2) is between 3.2 and 6; provided that when said subsidiary polyalkylene oxide has an equivalent weight of 1,500 or less and an average nominal functionality of at least 4, said subsidiary polyalkylene oxide is present in an amount of from 0.2 to weight percent based on the total weight of the polyol composition, and optionally (3) a stably dispersed polymer within the high functional polyol, the subsidiary polyalkylene oxide, or a mixture thereof wherein said polymer is present in an amount of less than 2 weight percent based on the total weight of the polyol composition or a polymer polyol or a blend of polymer polyols in an amount such that the polymer present in the polymer polyol or the blend of polymer polyols provides less than 2 weight percent of the total weight of the polyol composition.

2. A process as claimed in claim 1, wherein such high functionality polyol is a polyalkylene oxide polyol or polyalkylene polyol blend having an equivalent weight between 1000 and 3000 and an average nominal functionality between 3.2 and 6.

3. A process as claimed in claim 2, wherein said polyalkylene oxide polyol or polyol blend is a poly(oxyethylene-oxypropylene) polyol or blend of poly(oxyethylene-oxypropylene) polyols.

4. A process as claimed in claim 1, wherein said subsidiary polyalkylene oxide has an equivalent weight between 500 and 6000 and a poly(oxyethylene) content greater than 60 percent.

5. A process as claimed in claim 4, wherein said subsidiary polyalkylene oxides is a poly(oxyethylene-oxypropylene) polyol.

6. A process for the preparation of a high resilience slabstock polyurethane foam which process comprises preparing a foam formulation comprising a polyol, a high index polyisocyanate, water at from 1 to 5 pphp a crosslinking agent, a catalyst for the formation of urethane linkages in the foam formulation and a surfactant, and thereafter allowing the foam formulation to foam and cure characterised in that said polyol is a polyol composition of claim 1; wherein the average nominal functionality of the mixture of (1) and (2) is between 3.2 and 6.

7. A high resilience polyurethane foam whenever prepared by the process of claim 1.

* * * * *